(12) United States Patent
Gehrmann et al.

(10) Patent No.: US 10,230,738 B2
(45) Date of Patent: Mar. 12, 2019

(54) PROCEDURE FOR PLATFORM ENFORCED SECURE STORAGE IN INFRASTRUCTURE CLOUDS

(71) Applicant: Telefonaktiebolaget L M Ericsson (publ), Stockholm (SE)

(72) Inventors: Christian Gehrmann, Lund (SE); Fredric Morenius, Solna (SE); Nicolae Paladi, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 98 days.

(21) Appl. No.: 14/890,828

(22) PCT Filed: Nov. 6, 2013

(86) PCT No.: PCT/SE2013/051299
§ 371 (c)(1),
(2) Date: Nov. 12, 2015

(87) PCT Pub. No.: WO2014/185845
PCT Pub. Date: Nov. 20, 2014

(65) Prior Publication Data
US 2016/0087995 A1    Mar. 24, 2016

Related U.S. Application Data

(60) Provisional application No. 61/822,488, filed on May 13, 2013.

(51) Int. Cl.
*H04L 29/06* (2006.01)
*H04L 9/08* (2006.01)
*H04L 9/32* (2006.01)

(52) U.S. Cl.
CPC ............ *H04L 63/123* (2013.01); *H04L 9/083* (2013.01); *H04L 9/0822* (2013.01);
(Continued)

(58) Field of Classification Search
CPC . H04L 63/00; H04L 63/0428; H04L 63/0435; H04L 63/06; H04L 63/061;
(Continued)

(56) References Cited

U.S. PATENT DOCUMENTS 7,236,956 B1 * 6/2007 Ogg ...................... G06F 21/602
400/401
7,334,126 B1 * 2/2008 Gilmore .............. H04L 63/0281
707/999.001

(Continued)

FOREIGN PATENT DOCUMENTS

WO       2012148324 A1    11/2012

OTHER PUBLICATIONS

Popa et al., Enabling Security in Cloud Storage SLAs with CloudProof, Microsoft TechReport, MSR-TR—2010, vol. 46, pp. 1-12, 2010.
(Continued)

*Primary Examiner* — Eric W Shepperd
(74) *Attorney, Agent, or Firm* — Rothwell, Figg, Ernst & Manbeck, p.c.

(57) ABSTRACT

The present invention relates to a secure component for protecting data in a storage entity and a method at the secure component of protecting data in the storage entity. Further, the present invention relates to a secure domain manager for securely associating a communicating party with a storage domain and a method at the secure domain manager of securely associating the communicating party with the storage domain. Moreover, the present invention relates to a trusted third party for verifying correctness of a launch package created by a secure domain manager to securely associate a communicating party with a storage domain and a method at the trusted third party to verify correctness of the
(Continued)

launch package created by the secure domain manager to securely associate the communicating party with the storage domain.

30 Claims, 8 Drawing Sheets

(52) U.S. Cl.
CPC ............ *H04L 9/0897* (2013.01); *H04L 9/321* (2013.01); *H04L 9/3247* (2013.01); *H04L 9/3263* (2013.01); *H04L 63/061* (2013.01); *H04L 63/062* (2013.01); *H04L 63/0823* (2013.01)

(58) Field of Classification Search
CPC ..... H04L 63/062; H04L 63/12; H04L 63/123; H04L 9/00; H04L 9/08; H04L 9/0819; H04L 9/083; H04L 9/0894; H04L 9/3213
See application file for complete search history.

(56) References Cited

U.S. PATENT DOCUMENTS

| | | | |
|---|---|---|---|
| 8,170,213 B1 | 5/2012 | Harwood et al. | |
| 8,528,107 B1* | 9/2013 | Ginzton .............. | G06F 21/6281 713/193 |
| 9,698,988 B2* | 7/2017 | Ye .......................... | H04L 9/321 |
| 2004/0064729 A1 | 4/2004 | Yellepeddy | |
| 2005/0120219 A1* | 6/2005 | Munetoh ................. | G06F 21/52 713/176 |
| 2010/0082991 A1* | 4/2010 | Baldwin ................. | H04L 9/083 713/176 |
| 2011/0107085 A1* | 5/2011 | Mizikovsky ........ | H04L 63/0892 713/155 |
| 2011/0293096 A1* | 12/2011 | Reilly ................... | H04L 9/0833 380/277 |
| 2011/0302400 A1 | 12/2011 | Maino et al. | |
| 2011/0302415 A1 | 12/2011 | Ahmad et al. | |
| 2011/0307703 A1* | 12/2011 | Ogg ..................... | G06Q 20/382 713/176 |
| 2012/0204030 A1* | 8/2012 | Nossik .................. | H04L 9/0822 713/168 |
| 2013/0042106 A1 | 2/2013 | Persaud et al. | |
| 2013/0097296 A1 | 4/2013 | Gehrmann et al. | |
| 2013/0219473 A1* | 8/2013 | Schaefer ................ | G06F 21/31 726/4 |
| 2014/0079221 A1* | 3/2014 | McCallum ............ | H04L 9/0822 380/277 |
| 2014/0108722 A1* | 4/2014 | Lipchuk ................. | G06F 12/08 711/113 |
| 2014/0195573 A1* | 7/2014 | Nakagawa ........ | G06F 17/30194 707/827 |
| 2014/0201736 A1* | 7/2014 | Mizrahi .............. | G06F 9/45558 718/1 |
| 2014/0270166 A1* | 9/2014 | Avanzi .................. | H04L 9/0822 380/201 |

OTHER PUBLICATIONS

Paladi et al., Trusted Launch of Virtual Machine Instances in Public IaaS Environments, Lecture Notes in Computer Science, vol. 7839: Information Security and Cryptology—ICISC 2012, Springer Berlin Heidelberg, 2012, pp. 309-323.

Graf et al., Versatile Key Management for Secure Cloud Storage, 2012 IEEE Computer Society, pp. 469-474, DOI 10.1109/SRDS.2012.80.

Kamara et al., CS2: A Searchable Cryptographic Cloud Storage System, Microsoft Technical Report, 2011, MSR-TR-2011-58, 25 pages.

Omote et al., Hypervisor-based Background Encryption, Proceeding SAC '12, Proceedings of the 27th Annual ACM Symposium on Applied Computing, pp. 1829-1836, ACM New York, NY, USA 2012.

* cited by examiner

PROCEDURE FOR PLATFORM ENFORCED SECURE STORAGE IN INFRASTRUCTURE CLOUDS

CROSS-REFERENCE TO RELATED APPLICATIONS

This application is a 35 U.S.C. § 371 National Phase Entry Application from PCT/SE2013/051299, filed Nov. 6, 2013, and designating the United States, which claims priority to U.S. Provisional Application No. 61/822,488, filed May 13, 2013. The contents of both applications are incorporated by reference.

TECHNICAL FIELD

The present invention relates to a secure component for protecting data in a storage entity and a method at the secure component of protecting data in the storage entity. Further, the present invention relates to a secure domain manager for securely associating a communicating party with a storage domain and a method at the secure domain manager of securely associating the communicating party with the storage domain. Moreover, the present invention relates to a trusted third party for verifying correctness of a launch package created by a secure domain manager to securely associate a communicating party with a storage domain and a method at the trusted third party to verify correctness of the launch package created by the secure domain manager to securely associate the communicating party with the storage domain. The present invention relates further to corresponding computer programs and computer program products.

BACKGROUND

During recent years there has been a strong move in the marketplace towards the use of virtualization technologies. Among other capabilities, virtualization allows one to run unmodified legacy operating systems and applications on new hardware platforms using Virtual Machines (VMs). This is realized through on-the-fly translation from one hardware instruction set to another with the assistance of a so-called hypervisor or Virtual Machine Monitor (VMM). The VMM type considered here runs in the most privileged mode of a system and has full control over all vital system resources. A VMM-based system not only allows instruction translation but also, more importantly, increased system utilization as multiple VMs can run simultaneously on a single powerful hardware platform, opening for new business models and a new business landscape. This implies, for example, that existing services rather easily can be migrated into large and dynamic computing clusters, what often is referred to as "the cloud".

The cloud model where the customer is allowed to run a complete VM, including operating system, is often referred to as the Infrastructure as a Service (IaaS).

The new flexibility however has a price: increased security risks. Previously, physically isolated software systems might now run in VMs on the same physical node as other, completely unrelated, VMs. This allows for new types of attacks between VMs running simultaneously on the same hardware. Also, the VMM becomes a target for new types of attacks. Once the VMM is compromised the whole system is compromised. Furthermore, persistent data that was previously stored locally on a physical machine or within protected network boundaries in a central database, must now be available to a VM running in a potentially hostile network. Hence, there must be means to protect stored data and make sure that plaintext data only is exposed to VMs which are authorized to have access to it.

A large amount of academic and industry research has been carried out in the area of IaaS or "cloud" storage security.

For example, the prior art cryptographic storage system CloudProof allows read/write access that achieves integrity, confidentiality, fork-consistency and freshness, along with capabilities to provide proofs of data tampering. Kamara et al. introduced CS2 in "CS2: A searchable cryptographic cloud storage system", where in addition to the properties achieved in CloudProof, the cloud storage solution also achieves global integrity and scalable search. The latter is in particular achieved through the use of symmetric searchable encryption.

An IaaS cloud model may, e.g., use a so called OpenStack Nova architecture where a VM Management Client (VMMC) launches and controls VMs through well-defined API(s). From a security perspective, there are several problems. First, there must be means for the VMMC to have guarantees on that the VM instance not will be launched on an adverse host (wrongly configured or deliberately misconfigured host software/hardware platform).

Second, VM image integrity must be guaranteed prior to VM instance launch. These two conditions can be satisfied through alternative methods, as, e.g., implemented in CloudProof as well as in other prior art techniques using Trusted Computing Technologies as defined by the Trusted Computing Group (TCG) in combination with well-designed protocols for VM launch and migration.

However, these methods and protocols do not address the problem of how a VM instance (once it has been launched or migrated) obtains secure access to sensitive persistent data it is potentially dependent on. In particular, there should be means to protect both confidentiality and integrity of sensitive data during storage, and only allow authorized VM instances to have access to the plaintext representation of the data. While protection of data can be achieved through encryption and integrity protection, Message Authentication Codes (MAC) algorithms, the cryptographic keys used for encryption and MAC calculations must be available to the VM instance whenever it requires the data. Furthermore, cryptographic key handling schemes should minimize VMMC involvement in order to minimize the risks of mismanagement or client compromise.

SUMMARY

An object of the present invention is to solve, or at least mitigate, these problems in the art.

The present invention addresses these problems by providing trusted VM launch, storage confidentiality and integrity protection of data to be stored.

This problem is addressed in a first aspect of the present invention by a method at a secure component of protecting data in a storage entity. The method comprises receiving, from a communicating party, a request to store data in one of a plurality of storage entities of a storage domain, encrypting a request for cryptographic keys associated with said one of a plurality of storage entities with a session key of the storage domain to protect confidentiality and authenticity of the request, and sending, to a trusted third party, the encrypted request for cryptographic keys. Further, the method comprises receiving, from the trusted third party, cryptographic keys to protect confidentiality and integrity of the data to be stored, which cryptographic keys have been encrypted with the session key of the storage domain, decrypting the encrypted cryptographic keys, and associating the received cryptographic keys with the storage domain and the communicating party. Moreover, the method comprises encrypting the data with the cryptographic keys and storing the encrypted data in said one of a plurality of storage entities.

This problem is attained in a second aspect of the present invention by a method at a secure domain manager of securely associating a communicating party with a storage domain. The method comprises creating a launch package comprising an identifier for the storage domain, and an assertion that the secure domain manager is authorized to associate the communicating party with said storage domain, and digitally signing the launch package. Further, the method comprises acquiring a certificate from a trusted certificate authority configured to certify a verification key corresponding to that used for digitally signing the launch package, and submitting the digitally signed launch package and the certificate to a trusted third party for verification, such that the communicating party subsequently can be securely associated with the storage domain.

This problem is attained in a third aspect of the present invention by a method at a trusted third party to verify correctness of a launch package created by a secure domain manager to securely associate a communicating party with a storage domain. The method comprises receiving a digitally signed a launch package comprising an identifier for the storage domain, and an assertion that the secure domain manager is authorized to associate the communicating party with said storage domain, and receiving a certificate issued by a trusted certificate authority for certifying a verification key corresponding to that used for digitally signing the launch package. Further, the method comprises verifying the assertion to ensure that the secure domain manager is authorized to associate the communicating party with said storage domain, such that the communicating party subsequently can be securely associated with the storage domain.

Further, a device according to the respective method is provided.

Thus, the problem is attained in a fourth aspect of the present invention by a secure component for protecting data in a storage entity. The secure component comprises a processor and a memory. The memory contains instructions executable by the processor, whereby the secure component is operative to receive, from a communicating party, a request to store data in one of a plurality of storage entities of a storage domain, and encrypt a request for cryptographic keys associated with said one of a plurality of storage entities with a session key of the storage domain to protect confidentiality and authenticity of the request. Further, the secure component is operative to send, to a trusted third party, the encrypted request for cryptographic keys, and receive, from the trusted third party, cryptographic keys to protect confidentiality and integrity of the data to be stored, which cryptographic keys have been encrypted with the session key of the storage domain. Moreover, the secure component is operative to decrypt the encrypted cryptographic keys, associate the received cryptographic keys with the storage domain and the communicating party, and encrypt the data with the cryptographic keys and store the encrypted data in said one of a plurality of storage entities.

Thus, the problem is attained in a fifth aspect of the present invention by a secure domain manager for securely associating a communicating party with a storage domain. The secure domain manager comprises a processor and a memory. The memory contains instructions executable by the processor, whereby the secure domain manager is operative to create a launch package comprising an identifier for the storage domain and an assertion that the secure domain manager is authorized to associate the communicating party with said storage domain, and digitally sign the launch package. Further the secure domain manager is operative to acquire a certificate from a trusted certificate authority configured to certify a verification key corresponding to that used for digitally signing the launch package, and submit the digitally signed launch package and the certificate to a trusted third party for verification, such that the communicating party subsequently can be securely associated with the storage domain.

Thus, the problem is addressed in a sixth aspect of the present invention by a trusted third party for verifying correctness of a launch package created by a secure domain manager to securely associate a communicating party with a storage domain. The trusted third party comprises a processor and a memory. The memory contains instructions executable by the processor, whereby said trusted third party is operative to receive a digitally signed launch package comprising an identifier for the storage domain and an assertion that the secure domain manager is authorized to associate the communicating party with said storage domain. Further the trusted third party is operative to receive a certificate issued by a trusted certificate authority for certifying a verification key corresponding to that used for digitally signing the launch package; and verify the assertion to ensure that the secure domain manager is authorized to associate the communicating party with said storage domain, such that the communicating party subsequently can be securely associated with the storage domain.

Thus, the present invention advantageously addresses the outlined problems of the prior art by providing a persistent data protection. The present invention is advantageous for a number of reasons:

1. Data can be stored in the infrastructure cloud using any suitable storage units, such as block storage devices (e.g., Internet Small Computer System Interface (iSCSI) or similar). Confidentiality and integrity of the data is advantageously protected during storage.

2. Confidentiality and integrity protection of data on IaaS compute hosts can advantageously be ensured by a trusted VMM or by an entity trusted by the VMM (e.g., a privileged VM domain), further referred to as a "Secure Component" (SC). The SC has access to the storage keys needed to perform the necessary cryptographic operations on the data during storage and information retrieval.

3. Data stored in the IaaS cloud using the scheme described in the present invention is associated with specific storage domains. In the present invention, a storage domain typically corresponds to a particular organization or administrative domain that utilizes the cloud services (including the storage service) offered by the IaaS provider, i.e., a single administrative domain that typically only handles data storage for its own domain and not for any other domains. All data in a single domain is advantageously protected with the same storage protection master key, the domain key.

4. During the entire lifetime of a communicating party, referred to throughout the description as a VM, the VM is advantageously securely associated with a particular storage domain.

5. All keys used to encrypt/decrypt and integrity check data in a single domain are advantageously handled by a special trusted entity in the network referred to as a Trusted Third Party (TTP). The TTP assigns and handles domain keys. The domain keys cannot ever leave the TTP.

As can be deducted from the above, the present invention advantageously introduces:
- Principles for securely assigning a communicating party in the form of a VM to a particular storage domain at VM launch. This is mainly undertaken by the secure domain manager according to the second aspect of the present invention, also referred to as the VMMC, and further by the TTP according to the third aspect of the present invention.
- Principles for the SC to securely retrieve encryption and integrity protection keys when writing data to a persistent data storage area in the IaaS cloud.
- Principles for the SC to securely retrieve decryption and integrity verification keys for data retrieval.

Preferred embodiments of the present invention will be set out in the following.

The present invention allows protection of persistent data at storage in an IaaS cloud almost transparently from the point of view of VMMC. To achieve this, the present invention only relies on a trusted third party and a trusted configuration of a communicating party, i.e. a target node. The trustworthiness of the target node is ensured through the TCG sealing mechanism which makes the trust explicit. Only trusted entities in the IaaS have access to the security critical storage parameters or plaintext data, allowing arbitrary storage medium to be used as long as reliability (not confidentiality and integrity) can be guaranteed for these storage mediums. This opens up for secure and cost efficient storage handling in IaaS clouds.

To this end, protection of data on storage units in a cloud environment is provided. The approach of protecting data comprises intercepting a secure storage read or write request from a trusted VM, assigning the requesting VM into a trusted storage domain determined by a storage domain identifier (ID), communicating with a trusted entity in the from of a TTP to acquire confidentiality and integrity protection keys for the trusted storage domain, determining an available storage resource, and confidentiality and/or integrity protecting the data requested to be stored by the VM. The storage domain ID is specified by the VMMC at VM launch. Preferably, the method is performed by a Secure Component (SC) running on a VMM, i.e., a node of a cloud environment.

In an embodiment of the present invention, the integrity and/or confidentiality protection keys acquired from the trusted entity are calculated using a domain wide master key which is kept protected by the trusted entity.

In a further embodiment of the present invention, the integrity and confidentiality keys are calculated using a random nonce provided by the trusted entity.

In yet another embodiment of the present invention, upon requesting a new storage confidentiality and integrity key, the random nonce chosen by the trusted entity is sent back to the SC in the form of a token and stored as part of a metadata field of the protected stored data.

In still another embodiment of the present invention, a key internally kept by the trusted entity, in the form of an integrity key is used to integrity protect the token and thus the metadata.

In embodiments of the present invention, when the VM requests read or write of protected data, the SC uses the metadata and sends it to the trusted entity in order to retrieve the confidentiality and/or integrity protection keys used to decrypt and/or verify the stored data, or encrypt and integrity protect data to be stored.

In an embodiment of the present invention, the storage domain ID assigned to the VM is provided by the VM owner to the VMMC at launch of the VM.

In further embodiments of the present invention, the storage confidentiality and/or integrity protection keys provided by the trusted entity are sealed, i.e., encrypted using a trusted platform module in the form of the session key of the storage domain, to a trusted state of the target platform which is hosting the SC, i.e., the VMM, such that the keys will only be available to the SC if it is running on a trusted platform.

In still further embodiments of the present invention, after successfully acquiring confidentiality and/or integrity protection keys from the trusted entity, the SC keeps these keys in a protected cache memory for future use.

In an embodiment of the present invention, the SC sends a reference to the chosen storage resource and domain to be used for future write read access to the storage resource back to the requesting VM.

In the third aspect of the present invention, upon request for storage integrity and/or confidentiality keys for a particular storage domain, the trusted entity checks that the client that has launched the VM is authorized to request based on any of the following parameters provided by the client at VM launch: the storage domain ID for the storage domain that the client intend to use for the VM, and an assertion authorizing the client to access and store protected data at the chosen storage domain.

In further embodiments of the present invention, the launch package comprises an ID of the VM to be launched and/or an encrypted nonce.

In the second aspect of the present invention, at launch via the trusted platform, the client (i.e. the VMMC) sends a launch message to the trusted entity, the launch message comprising a signature over parameters provided by the client at VM launch. Further, the client sends, via the trusted platform, a certificate certifying the key used to sign the launch message to the trusted entity.

Further embodiments of the present invention will be discussed in the detailed description.

Thus, embodiments of the present invention address enable trusted VM launch, key management, data access authorization, and persistent storage confidentiality and integrity protection, in order to ensure protected access to persistent VM instance sensitive data in IaaS models.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
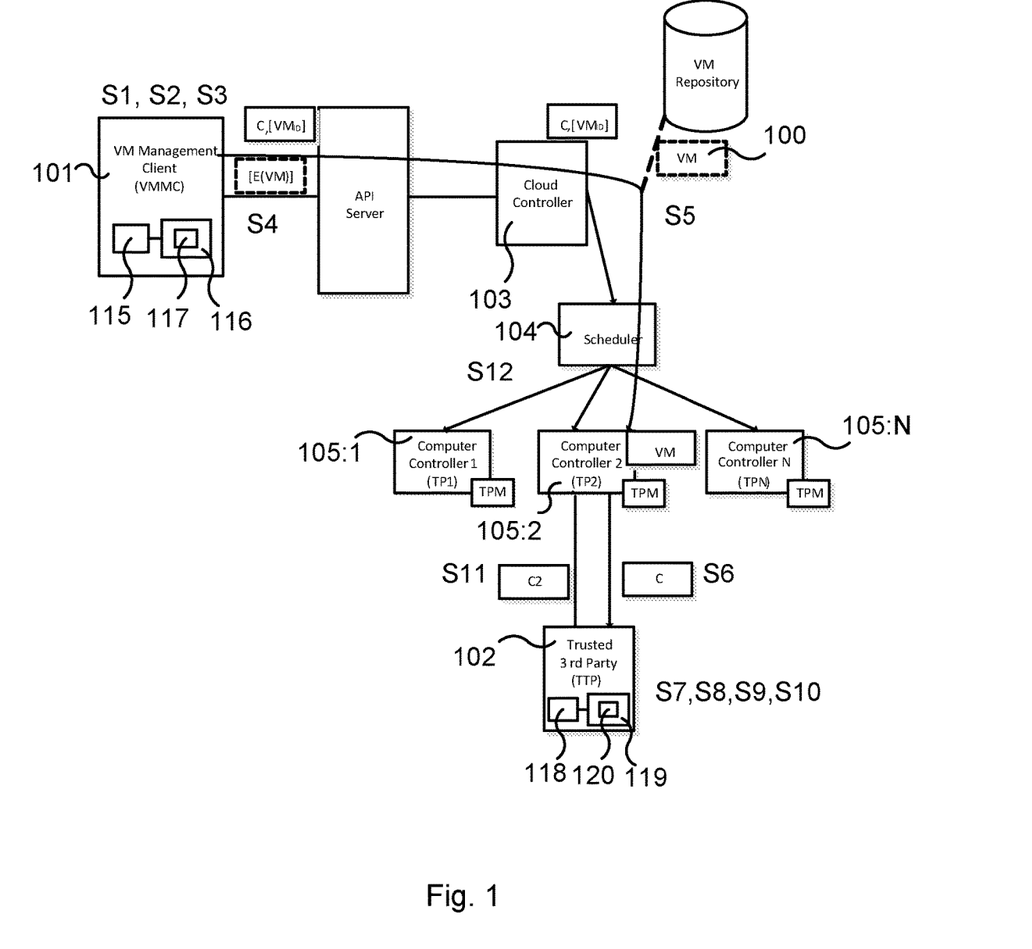
FIG. 1 illustrates a system implementing embodiments of the present invention.

FIG. 1 illustrates a system implementing embodiments of the second and third aspect of the present invention. The system set out in FIG. 1 will be described in detail in the following. However, before the detailed description is given, a more general embodiment of the method according to the second aspect of the present invention, as well as of the third aspect, will be described. The method according to the second aspect of the present invention of securely associating a communicating party, such as a VM 100, with a storage domain (not shown in FIG. 1; described in the following with reference to FIGS. 5 and 7) is performed at a secure domain manager, e.g. a VMMC 101. In practice, the method at the VMMC 101 is performed by a processing unit 115 embodied in the form of one or more microprocessors arranged to execute a computer program 117 downloaded to a suitable storage medium 116 associated with the microprocessor, such as a Random Access Memory (RAM), a Flash memory or a hard disk drive. The processing unit 115 is arranged to carry out the method according to embodiments of the first aspect of the present invention when the appropriate computer program 117 comprising computer-executable instructions is downloaded to the storage medium 116 and executed by the processing unit 115. The storage medium 116 may also be a computer program product comprising the computer program 117. Alternatively, the computer program 117 may be transferred to the storage medium 116 by means of a suitable computer program product, such as a floppy disk or a memory stick. As a further alternative, the computer program 117 may be downloaded to the storage medium 116 over a network. The processing unit 115 may alternatively be embodied in the form of a digital signal processor (DSP), an application specific integrated circuit (ASIC), a field-programmable gate array (FPGA), a complex programmable logic device (CPLD), etc.

Figure 2:
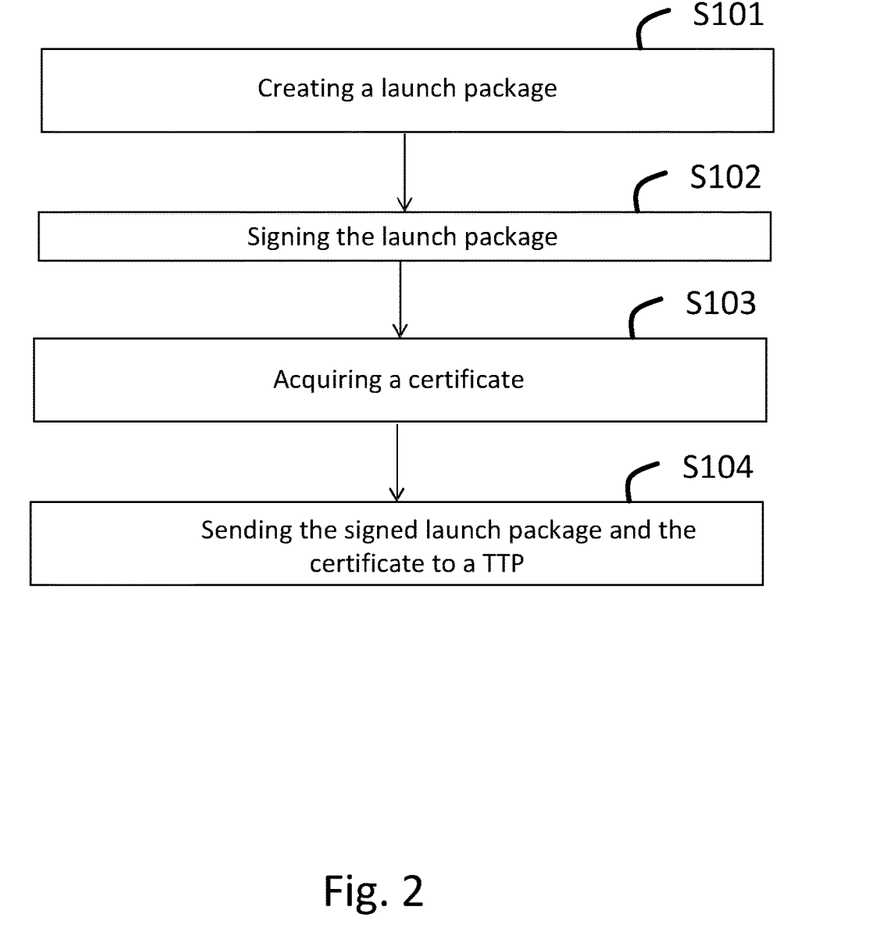
FIG. 2 illustrates a flowchart of an embodiment of a method of securely associating a communicating party with a storage domain according to the second aspect of the present invention.

Now, in order to advantageously securely associate a communicating party, such as a VM 100, with a storage domain, an embodiment of a method according the second aspect of the present invention is proposed, a flowchart of which is shown in FIG. 2. Reference is further made to FIG. 1. In a first step, S101, the VMMC 101 creates a launch package comprising an identifier for the storage domain, and an assertion that the secure domain manager is authorized to associate the VM 100 with said storage domain. In step S102, the VMMC 101 digitally signs the launch package using an appropriate signing key, and in step S103, the VMMC 101 acquires a certificate from a trusted certificate authority (not shown in FIG. 1) for certifying a verification key corresponding to the signing key previously used for digitally signing the launch package. Finally, in step S104, the VMMC 101 submits the digitally signed launch package and the certificate to a trusted third party 102 for verification, such that the VM 100 subsequently can be securely associated with the storage domain.

Again with reference to FIG. 1, the method according to the third aspect of the present invention of verifying correctness of a launch package created by a VMMC 101 to securely associate a VM 100 a with a storage domain is performed at the TTP 102. In practice, similar to the description of the VMMC 101 hereinabove, the method at the TTP 102 is performed by a processing unit 118 embodied in the form of one or more microprocessors arranged to execute a computer program 120 downloaded to a suitable storage medium 119 associated with the microprocessor, as previously has been discussed with reference to the VMMC 101.

Figure 3:
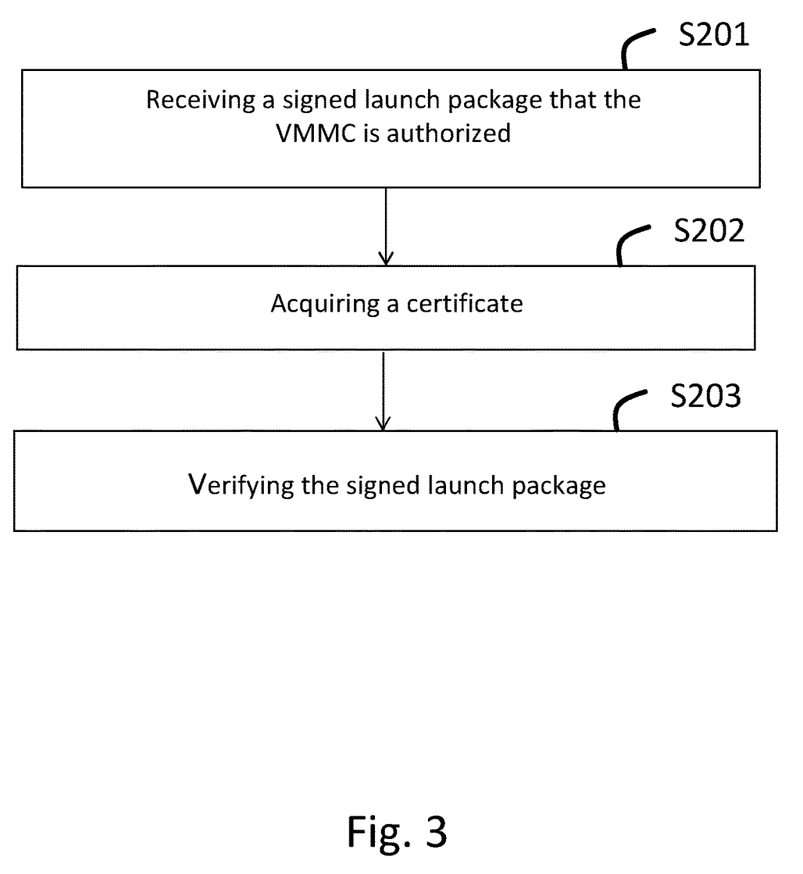
FIG. 3 illustrates a flowchart of an embodiment of a method of verifying correctness of a launch package in order to securely associate a communicating party with a storage domain according to the third aspect of the present invention.

In order to advantageously verify correctness of a launch package created by the VMMC 101 to securely associate the VM 100 a with a storage domain, an embodiment of a method according the third aspect of the present invention is proposed, a flowchart of which is shown in FIG. 3. Reference is further made to FIG. 1. In a first step, S201, the TTP 102 receives, from the VMMC 101, a digitally signed launch package comprising an identifier for the storage domain, and an assertion that the VMMC 101 is authorized to associate the VM 100 with the storage domain. In a second step S202, the TTP 102 receives a certificate issued by a trusted certificate authority (not shown in FIG. 1) for certifying a verification key corresponding to that used for digitally signing the launch package. Thereafter, the TTP 102 verifies in step S203 the assertion to ensure that the VMMC 101 is authorized to associate the VM 100 with the storage domain, such that the VM 100 subsequently can be securely associated with the storage domain.

Figure 4:
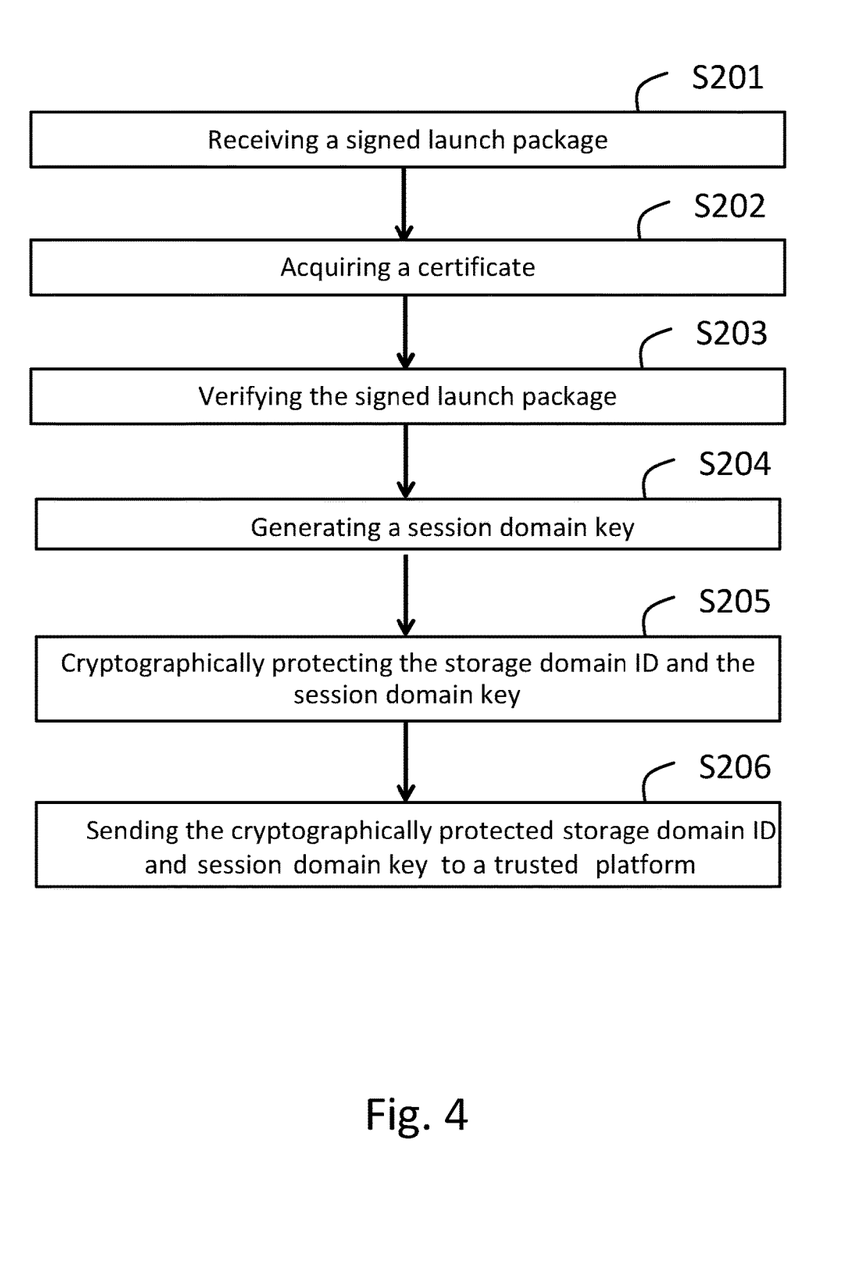
FIG. 4 shows a flowchart of a further embodiment of the method according to the third aspect of the present invention.

FIG. 4 shows a flowchart of a further embodiment of the method according to the third aspect of the present invention. After step S203 has been performed by the TTP 102, it proceeds to step S204 of generating a session domain key for the storage domain and a target platform. Further, in step S205, the TTP 102 cryptographically protects the storage domain identifier and the session domain key with a secret key of a trusted platform 105:1, 105:2, 105:N on which the VM 100 is to reside before sending, in step S206, the cryptographically protected storage domain identifier and the session domain key to the trusted platform 105, wherein the trusted platform 105 can make available to a secure component the session domain key and securely associate the VM 100 with the storage domain.

Again with reference to FIG. 1, the VM 100 launch procedure illustrated therein according to embodiments of the second and third aspects of the present invention will be described in detail in the following. The VM launch procedure is undertaken for securely associating a VM 100 with a particular storage domain at VM launch.

S1. The VMMC 101 prepares a VM 100 launch package containing a launch message, M. M comprises the following:

a. A certain storage domain ID, DID. In the following, it is assumed DID=A.

b. An assertion, AS, proving to a TTP 102, that the VMMC 101 is authorized to issue VMs 100 for storage domain A, i.e. that the VMMC 101 is authorized to associate the VMs 100 with the storage domain A.

c. Optionally a nonce, $N_{VMMC}$, encrypted with the public key of the TTP 102, $K\_Pu_{TTP}$.

d. Optional additional parameters such as required target Platform Security Level (SP), a VM identity, $VM_{ID}$, and a hash Hvm of the target VM image (i.e., the actual binary of the VM to be launched) or an encrypted key, Kvm that can be used to decrypt the encrypted target VM image E(VM).

S2. In addition, the VMMC 101 produces a digital signature, SIG, over all content in M using the private key of the VMMC 101, $K\_Pr_{VMMC}$.

S3. The VMMC 101 retrieves a certificate, $Cert_{VMMC}$, from a trusted certificate authority (not shown in FIG. 1) that certifies the public key used by the VMMC 101. The corresponding private key is $K\_Pr_{VMMC}$.

S4. The VMMC 101 prepares a data structure C containing M, $Cert_{VMMC}$ and SIG. Thus, the data structure C is configured to comprise the signed launch package created in step S1 and the certificate acquired in step S3. The data structure C is sent to the IaaS provider, optionally along with E(VM) or an indication of the VM image that should be chosen for launch from a publicly available VM store ($ID_{VMIMG}$).

S5. The IaaS provider, which in FIG. 1 is embodied in the form of a cloud controller 103 and a scheduler 104, selects a suitable available trusted platform (TP) 105 in the provider network and transfers the data structure C optionally together with the VM image (in encrypted or plaintext form) or the $ID_{VMIMG}$ to the chosen TP 105. Each TP 105 may optionally comprise a trusted platform module (TPM) for encrypting the storage confidentiality and/or integrity protection keys.

S6. When the data structure C reaches the intended TP 105, the TP 105 contacts the TTP 102 and sends the data structure C to the TTP 102 for verification.

S7. The TTP 102 verifies the certificate, $Cert_{VMMC}$, and the signature SIG. If both $Cert_{VMMC}$ and SIG are valid, the TTP 102 proceeds with the next step; otherwise it aborts with an error message to the intended TP 105.

S8. The TTP 102 checks the assertion, AS (using the VMMC identity and key information provided in $Cert_{VMMC}$) and checks if the VMMC 101 is authorized to use storage domain A. If so, the TTP 102 proceeds with the next step, otherwise it aborts with an error message to the intended TP 105.

S9. Using its private key, the TTP 102 decrypts $N_{VMMC}$ optionally received in the data structure C.

S10. The TTP 102 generates a session domain key ($SD_A$) for domain A and the target platform.

S11. Parameters A and $SD_A$ (optionally together with other parameters such as $N_{VMMC}$ and $H_{VM}$) are sealed to a protected state of the intended TP 105, i.e. encrypted with a public key of the TP 105 which has a property of only being available to the TP if the TP is booted in a trusted state. The encrypted message, denoted C2, is sent back to the intended TP 105.

S12. The intended TP 105 unseals (i.e. decrypts) C2 and makes sure $SD_A$ is available to the SC which is to run on the TP. The TP 105 optionally assigns the TP unique identity $VM_{ID}$ to the VM and associates that with domain A. The VM 100 is then launched in a secure isolated execution compartment on the TP 105.

Figure 5:
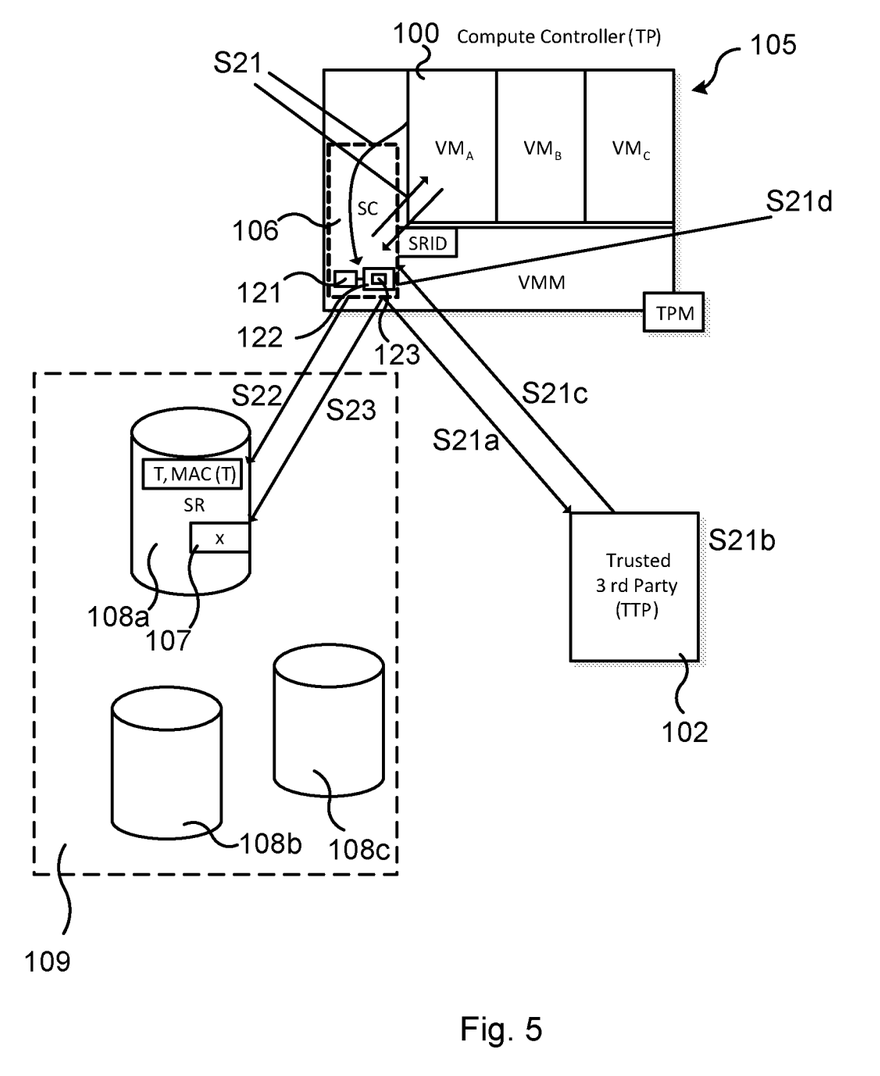
FIG. 5 illustrates a system implementing embodiments of the present invention.

FIG. 5 illustrates a system implementing the first aspect of the present invention. The system set out in FIG. 5 will be described in detail in the following. However, before the detailed description is given, a more general embodiment of the method according to the first aspect of the present invention will be described. The method according to the first aspect of the present invention of protecting data in a storage entity is performed at a secure component (SC) 106, such as, e.g., a computer, a server, a supervising entity in a telecom system, etc., i.e., a device having computing capabilities.

In practice, the method at the SC 106 is performed by a processing unit 121 embodied in the form of one or more microprocessors arranged to execute a computer program 123 downloaded to a suitable storage medium 122 associated with the microprocessor, as previously has been discussed in connection to FIG. 1 and the VMMC 101 and the TTP 102.

Figure 6:
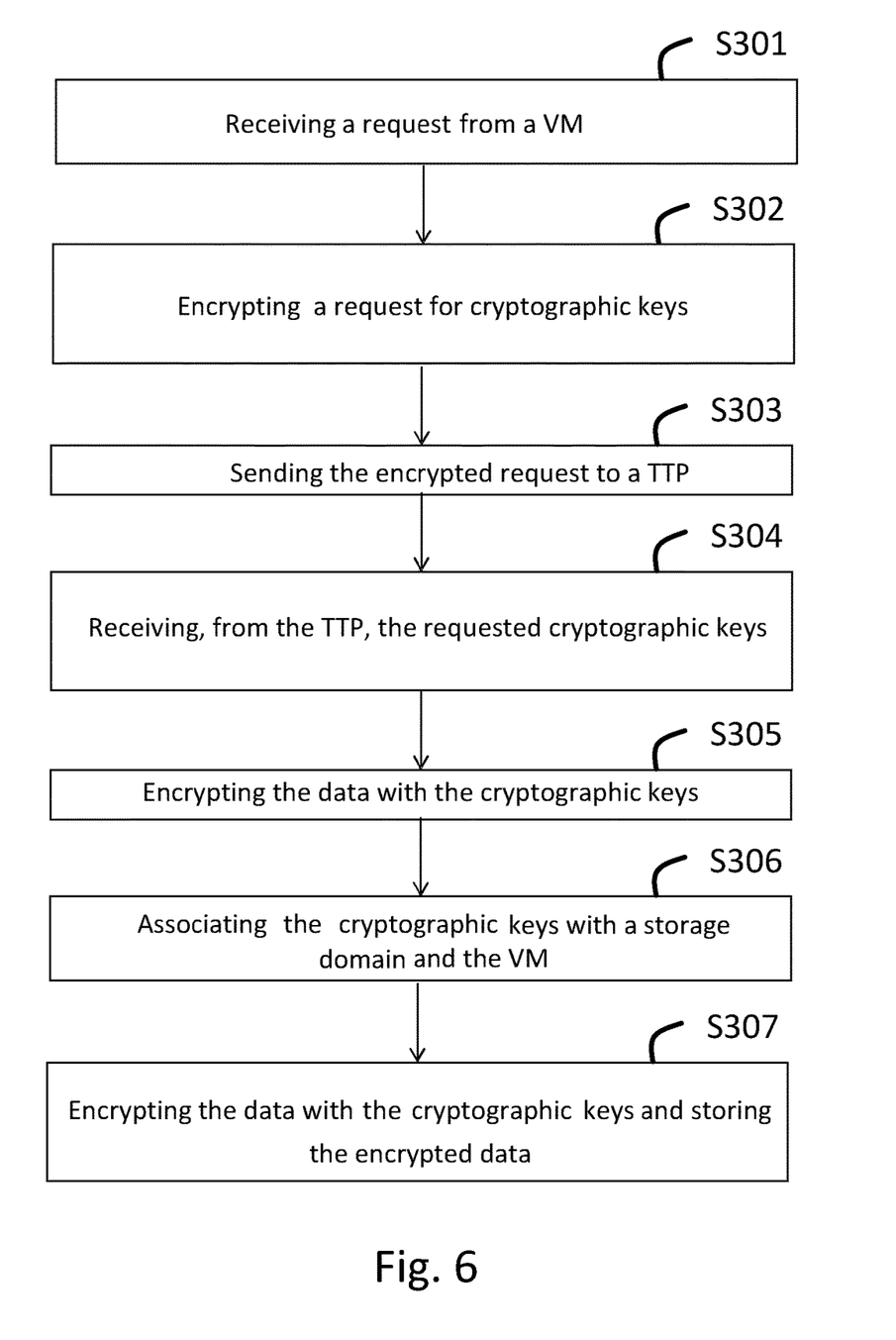
FIG. 6 illustrates a flowchart of an embodiment of a method of protecting data in a storage entity according to the first aspect of the present invention.

In order to advantageously protect data in a storage entity, an embodiment of a method according the first aspect of the present invention is proposed, a flowchart of which is shown in FIG. 6. Reference is further made to FIG. 5. In a first step, S301, the SC 106 receives, from a communicating party in the form of a VM 100, a request to store data in one of a plurality of storage entities 107 of a storage domain 109, which storage entity 107 may be embodied as a specific storage area on a storage resource such as a server 108a. In FIG. 5, a number of servers 108a, 108b, 108c make up the storage domain 109. It should be noted that the storage resources 108a-c comprised in the storage domain 109 could be remotely arranged, and are thus not necessarily adjacently located each other. In fact, they could even be located in different parts of the world. In a second step S302, the processing unit 121 encrypts a request for cryptographic keys associated with said one 107 of a plurality of storage entities with a session key of the storage domain 109 to protect confidentiality and authenticity of the request. Thereafter, in step S303, the SC 106 sends the encrypted request for cryptographic keys to a TTP 102. In a fourth step S304, the SC 106 receives from the TTP 102 cryptographic keys to protect confidentiality and integrity of the data to be stored, which cryptographic keys have been encrypted with the session key of the storage domain 109. In subsequent steps S305 and S306, the SC 106 decrypts the encrypted cryptographic keys and associates the received cryptographic keys with the storage domain 109 and the VM 100. Finally, in step S307, the SC 106 encrypts the data with the cryptographic keys and stores the encrypted data in said one 107 of a plurality of storage entities.

Again with reference to FIG. 5, the data set-up/first time write procedure illustrated therein according to embodiments of the first aspect of the present invention will be described in detail in the following.

S21. The VM 100 with identity $VM_{ID}$ running on the TP 105 requests access to a storage resource 108a, i.e., block device or database (denoted as SR), in the provider network being part of a storage domain 109 also comprising servers 108b and 108c. The storage resource reference is denoted SRID. Using SRID as reference, the VM 100 specifically requests a data write to a storage entity 107 denoted x in SR (this can be a block or other storage structure). This request is intercepted or received by the SC 106 and the following procedure applies.

a. The SC 106 sends, protected under key $SD_A$, a request to the TTP 102 for new storage entity keys for entity x, domain A and SRID.

b. The TTP 102 checks, using the key $SD_A$, that the request received above is correct. If so, the TTP 102 fetches the domain key for domain A and may generate a large enough nonce value, $N_{TTP}$. Next, the TTP 102 optionally uses a suitable pseudorandom function (PRF), PRF($KM_A$, $N_{TTP}$) to generate data encryption and integrity protection keys for storage entity x (denoted $KE_x$ and $KI_x$ respectively). Next the TTP 102 generates a token, T, consisting of $N_{TPP}$, the domain ID A and SRID. Furthermore, the TTP 102 uses an internal integrity key to calculate an integrity check value, over token T, MAC(T).

c. Next, the TTP 102 sends T, MAC(T) and the keys KEx and KIx to the SC 106. This message is confidentiality and integrity protected using $SD_A$.

d. The SC 106 receives the message generated in step c and decrypts T, MAC(T) and the $KE_x$ and $KI_x$ keys and associates them with domain A and $VM_{ID}$.

S22. The SC 106 stores T and MAC(T) received from the TTP 102 in step d above as part of storage metadata for the new storage entity x in SR 108a.

S23. The SC 106 uses keys $KE_x$ and $KI_x$ to confidentiality and/or integrity protect the data stored in storage entity x in SR 108a.

In terms of performance and efficiency, it is advisable that the storage entity unit is selected so that the communication frequency between the SC 106 and TTP 102 and SC activities does not incur a larger performance penalty than what is acceptable by the involved parties. Also, the storage entity unit should be selected so that integrity protection meta-data does not consume a larger portion of storage than what is acceptable by the involved parties.

Figure 7:
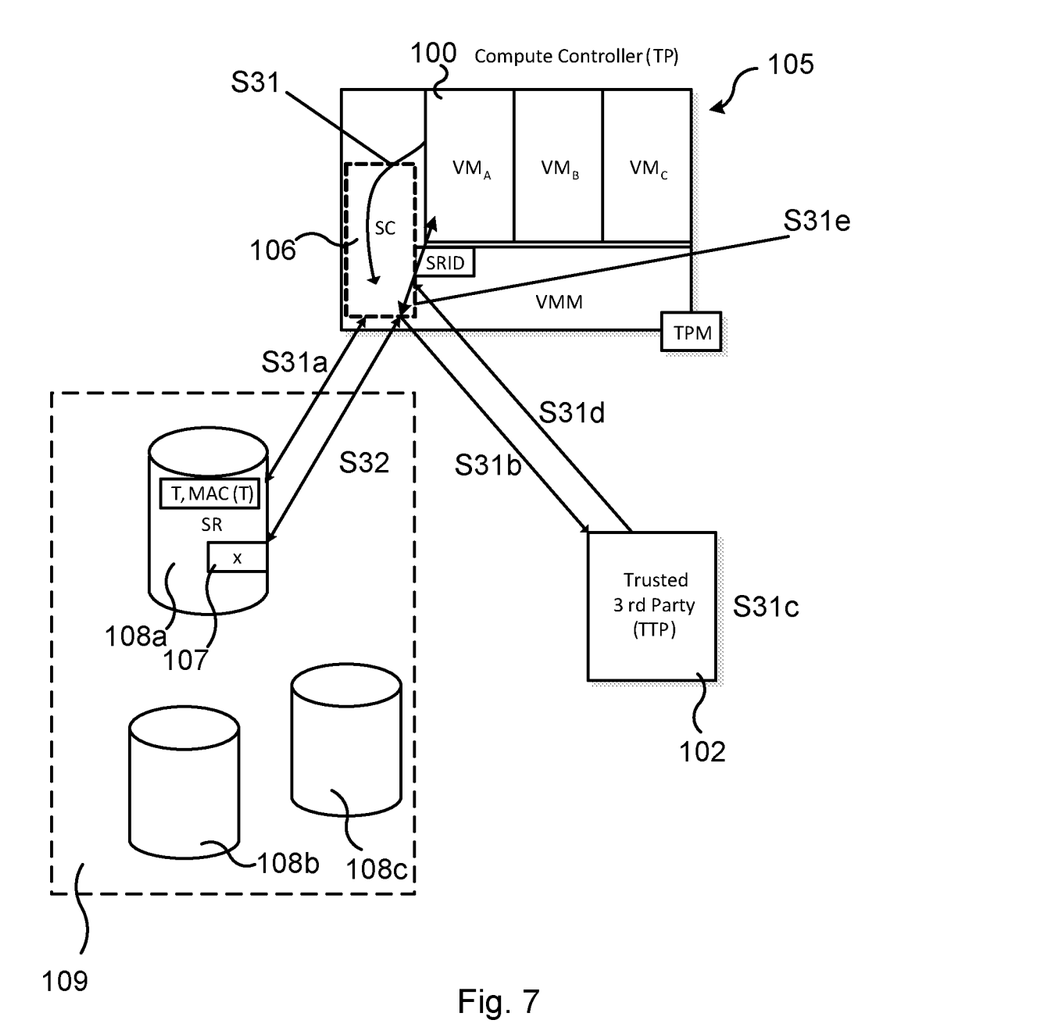
FIG. 7 illustrates the system of FIG. 5 implementing further embodiments of the present invention.

FIG. 7 illustrates the system of FIG. 5, but where a consecutive data write and read procedure is undertaken, i.e. after the set-up procedure illustrated in the flowchart of FIG. 6 with reference to steps S301-S307, and in greater detail in steps S21a-d, S22 and S23 of FIG. 5, has been undertaken. The consecutive data write/read procedure according to embodiments of the first aspect of the present invention is described in detail in the following.

S31. The VM 100, which may be identified to the TP 105 by the VM identifier $VM_{ID}$, requests, e.g., by using the SRID reference, to write data to or read data from the entity x (denoted 107) in SR 108a being part of a storage domain 109 also comprising servers 108b and 108c. This request is intercepted or received by the SC 106 and the following procedure applies.

a. The SC 106 checks, using $VM_{ID}$, if the required integrity and confidentiality keys needed to integrity protect and/or encrypt (write) or verify and/or decrypt (read) the requested storage entity x are already cached in a memory 116 of the SC 106. If that is the case, it proceeds to step 32 below. Otherwise, it locates T and MAC(T) (used to protect x) in SR storage metadata and continues to step b.

b. The SC 106 sends T and MAC(T) to the TTP 102, along with a request for the data entity keys for x, domain A and SRID. All is protected under key $SD_A$.

c. The TTP 102 checks, using key $SD_A$, that the request received above is correct. If so, the TTP 102 verifies the received token T (using its own internal MAC key). If the token is valid, the TTP 102 checks that the DID and SRID contained in T match the DID and SRID indicated by the SC 106. If all the above verifications are successful, The TTP 102 uses the $KM_A$ domain key and optionally the $N_{TTP}$ nonce in T to derive the $KE_x$ and $KI_x$ keys.

d. Next, the TTP 102 sends the keys $KE_x$ and $KI_x$ to the SC 106; the keys being confidentiality and integrity protected using $SD_A$.

e. The SC 106 receives and decrypts the encrypted keys.

S32. The SC 106 uses keys $KE_x$ and $KI_x$ to encrypt and/or integrity protect (write) or decrypt and/or integrity check (read) data at storage entity x.

Thus, with the procedure illustrated in FIG. 7, secure data writes/reads can advantageously be made to/from the storage entity x.

Figure 8A:
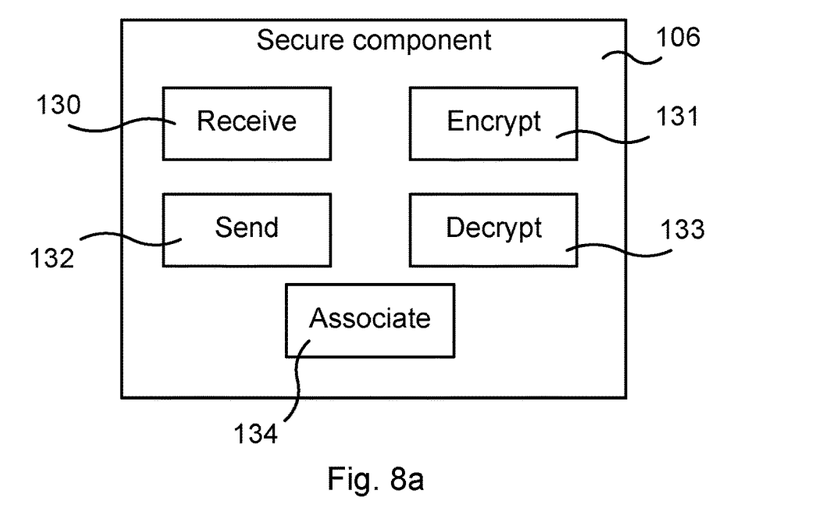
FIG. 8a shows a secure component according to an embodiment of the first aspect of the present invention.

FIG. 8a shows a secure component 106 according to an embodiment of the first aspect of the present invention. The secure component 106 comprises receiving means 130 adapted to receive, from a communicating party, a request to store data in one of a plurality of storage entities of a storage domain, and encrypting means 131 adapted to encrypt a request for cryptographic keys associated with said one of a plurality of storage entities with a session key of the storage domain to protect confidentiality and authenticity of the request. The secure component 106 further comprises sending means 132 adapted to send, to a trusted third party 102, the encrypted request for cryptographic keys, and the receiving means 130 further being adapted to receive, from the trusted third party, cryptographic keys to protect confidentiality and integrity of the data to be stored, which cryptographic keys have been encrypted with the session key of the storage domain. Moreover, the secure component 106 comprises decrypting means 133 adapted to decrypt the encrypted cryptographic keys, associating means 134 adapted to associate the received cryptographic keys with the storage domain and the communicating party. The encrypting means 131 is further adapted to encrypt the data with the cryptographic keys and store the encrypted data in said one of a plurality of storage entities. The receiving means 130 and sending means 132 may comprise a communications interface for receiving and providing information to other parties. The receiving means 130, encrypting means 131, sending means 132, decrypting means 133 and associating means 134 may (in analogy with the description given in connection to FIG. 5) be implemented by a processor embodied in the form of one or more microprocessors arranged to execute a computer program downloaded to a suitable storage medium associated with the microprocessor, such as a RAM, a Flash memory or a hard disk drive. The receiving means 130 and the sending means 132 may comprise one or more transmitters and/or receivers and/or transceivers, comprising analogue and digital components and a suitable number of antennae for radio communication.

Figure 8B:
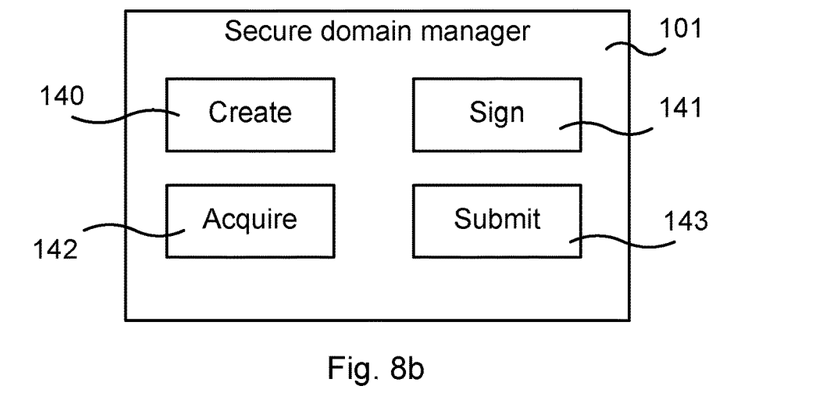
FIG. 8b shows a secure domain manager according to an embodiment of the second aspect of the present invention.

FIG. 8b shows a secure domain manager 101 according to an embodiment of the second aspect of the present invention. The secure domain manager 101 comprises creating means 140 adapted to create a launch package comprising an identifier for a storage domain, and an assertion that the secure domain manager 101 is authorized to associate a communicating party with the storage domain, and further comprises signing means 141 adapted to digitally sign the launch package. Moreover, the secure domain manager 101 comprises acquiring means 142 adapted to acquire a certificate from a trusted certificate authority for certifying a verification key corresponding to that used for digitally signing the launch package, and further comprises submitting means 143 adapted to submit the digitally signed launch package and the certificate to a trusted third party for verification, such that the communicating party subsequently can be securely associated with the storage domain. The submitting means 142 may comprise a communications interface providing information to (and possibly receiving information from) other parties. The creating means 140, signing means 141, acquiring means 142 and submitting means 143 may (in analogy with the description given in connection to FIG. 1) be implemented by a processor embodied in the form of one or more microprocessors arranged to execute a computer program downloaded to a suitable storage medium associated with the microprocessor, such as a RAM, a Flash memory or a hard disk drive. The submitting means 140 may comprise one or more transmitters and/or receivers and/or transceivers, comprising analogue and digital components and a suitable number of antennae for radio communication.

Figure 8C:
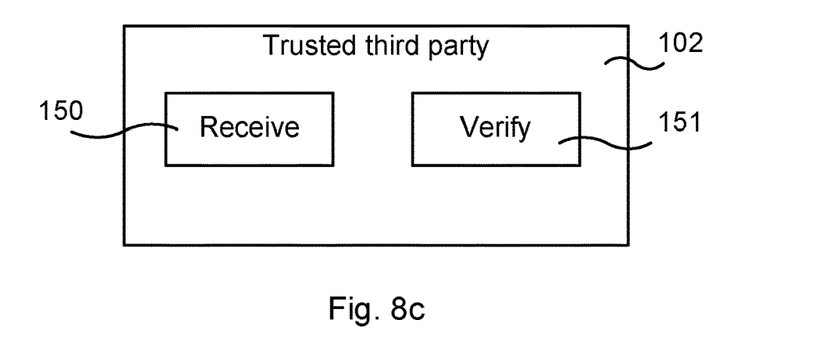
FIG. 8c shows a trusted third party according to an embodiment of the third aspect of the present invention.

FIG. 8c shows a trusted third party 102 according to an embodiment of the third aspect of the present invention. The trusted third party 102 comprises receiving means 150 adapted to receive a digitally signed launch package comprising an identifier for a storage domain, and an assertion that a secure domain manager is authorized to associate a communicating party with the storage domain. The receiving means 150 is further adapted to receive a certificate issued by a trusted certificate authority for certifying a verification key corresponding to that used for digitally signing the launch package. Further, the trusted third party 102 comprises verifying means 151 adapted to verify the assertion to ensure that the secure domain manager is authorized to associate the communicating party with the storage domain, such that the communicating party subsequently can be securely associated with the storage domain. The receiving means 150 may comprise a communications interface receiving information from (and possibly providing information to) other parties. The receiving means 150 and verifying means 151 may (in analogy with the description given in connection with FIG. 1) be implemented by a processor embodied in the form of one or more microprocessors arranged to execute a computer program downloaded to a suitable storage medium associated with the microprocessor, such as a RAM, a Flash memory or a hard disk drive. The receiving means 150 may comprise one or more receivers and/or transmitters and/or transceivers, comprising analogue and digital components and a suitable number of antennae for radio communication.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by a trusted platform (TP), comprising:
    transmitting to a trusted third party (TTP) information comprising a storage domain identifier identifying a particular storage domain;
    after transmitting the information to the TTP, receiving, from the TTP, a session domain key (SDa) for the storage domain identified by the storage domain identifier;
    obtaining, from a communicating party, a first request to store data in a storage entity of the particular storage domain identified by the storage domain identifier, wherein the storage entity is one of a plurality of storage entities of the storage domain;
    generating a second request for a cryptographic key associated with the storage entity of the storage domain;
    encrypting the second request for the cryptographic key to protect confidentiality and authenticity of the second request, wherein the second request is encrypted using the session domain key (SDa) received from the TTP;
    sending, to the TTP, the encrypted second request;
    receiving, from the TTP, a message comprising an encrypted version of the cryptographic key;
    after receiving the encrypted cryptographic key, decrypting the received encrypted cryptographic key;
    associating the obtained cryptographic key with the storage domain and the communicating party; and
    encrypting the data with the cryptographic key and storing the encrypted data in said storage entity.

2. The method of claim 1, wherein
    the session domain key (SDa) is generated by the TTP,
    the step of receiving the SDa from the TTP comprises receiving an encrypted message transmitted by the TPP, wherein the TTP generated the encrypted message using a public key belonging to the TP,
    the encrypted message comprises the SDa and the storage domain identifier (SDI), and
    the method further comprises the TP decrypting the encrypted message using a private key belonging to the TP.

3. The method of claim 2, wherein
    the information transmitted to the TTP further comprises an encrypted nonce (Nvmmc) that was generated using a public key belonging to the TTP, and
    the encrypted message further comprises the none (Nvmmc).

4. The method of claim 1, wherein
    the cryptographic key is generated by the TPP using a master key and a nonce, and
    the message received from the TPP further comprises i) an encrypted token, wherein the token comprises said nonce, and ii) an encrypted message authentication code (MAC) for authenticating the token.

5. The method of claim 4, wherein the encrypted token and the encrypted MAC were encrypted using the session domain key of the storage domain.

6. The method of claim 5, further comprising the steps of:
    decrypting the encrypted token and the MAC; and
    associating the token and the MAC with the storage domain and the communicating party.

7. The method of claim 6, further comprising:
    receiving, from the communicating party, a third request to read the encrypted data;
    determining that the cryptographic key is not stored in a local cache;
    as a result of determining that the cryptographic key is not stored in a local cache, sending, to the trusted third party, a request message comprising the token and the MAC; and
    receiving, from the trusted third party, the cryptographic key.

8. The method of claim 1, further comprising:
    receiving, from the communicating party, a third request to read the encrypted data in said one of a plurality of storage entities of the storage domain;
    fetching, from a local cache, the cryptographic key; and
    decrypting the encrypted data with the cryptographic key.

9. The method of claim 1, further comprising:
receiving, from the communicating party, a third request to store new data in said one of a plurality of storage entities of the storage domain;
fetching, from a local cache, cryptographic keys associated with said one of a plurality of storage entities; and
encrypting the new data with the cryptographic keys associated with said one of a plurality of storage entities and storing the encrypted new data in said one of a plurality of storage entities.

10. The method of claim 9, further comprising:
receiving, from the communicating party, a third request to store new data in said one of a plurality of storage entities of the storage domain;
determining that the cryptographic key is not stored in a local cache;
as a result of determining that the cryptographic key is not stored in a local cache, sending, to the trusted third party, a request message comprising the token and the MAC;
receiving, from the trusted third party, the cryptographic key; and
encrypting the new data with the cryptographic key.

11. The method of claim 1, wherein the communicating party is a virtual machine running on a trusted platform.

12. The method of claim 1, further comprising:
sending a storage entity identifier to the communicating party to be used for identifying a storage entity associated with said storage entity identifier.

13. A computer program product comprising a non-transitory computer readable medium storing a computer program comprising computer-executable instructions for causing a device to perform the steps recited in claim 1.

14. The method of claim 1, further comprising:
prior to transmitting to the trusted third party (TTP) the information comprising the storage domain identifier, receiving a data structure (C) generated by a virtual machine management client (VMMC), the data structure comprising a launch message (M) comprising the storage domain identifier (DID) and an assertion (AS) that the VMMC is authorized to issue virtual machines (VMs) for the storage domain identified by the storage domain identifier.

15. The method of claim 14, wherein receiving, from the TTP, the session domain key (SDa) comprises: receiving an encrypted version of SDa, wherein the encrypted version of SDa was created using a public key associated with the trusted platform (TP) and decrypting the encrypted version of SDa using a private key belonging to the TP, thereby receiving SDa.

16. The method of claim 15, wherein the TP transmits the information comprising the storage domain identifier to the TPP in response to receiving the data structure.

17. The method of claim 16, wherein the information transmitted to the TTP further comprises the assertion (AS).

18. The method of claim 16, wherein the information transmitted to the TTP further comprises:
i) a certificate issued from a trusted authority, wherein the certificate certifies a public key belonging to the VMMC, and
ii) a signature generated using a private key belonging to the VMMC and the entire launch message.

19. A secure component for protecting data in a storage entity comprising: a processor and a memory, said memory containing instructions executable by said processor, wherein said secure component is operative to:
transmit to trusted third party (TTP) information comprising a storage domain identifier identifying a particular storage domain;
after transmitting the information to the TTP, receive, from the TTP, a session domain key (SDa) for the storage domain identified by the storage domain identifier;
obtain, from a communicating party, a first request to store data in a storage entity of the particular storage domain identified by the storage domain identifier, wherein the storage entity is one of a plurality of storage entities of the storage domain;
generate a second request for a cryptographic key associated with the storage entity of the storage domain;
encrypt the second request for the cryptographic key to protect confidentiality and authenticity of the second request, wherein the second request is encrypted using the session domain key received from the TTP;
send, to the TTP, the encrypted second request;
receive, from the TTP, a message comprising an encrypted version of the cryptographic key;
after receiving the encrypted cryptographic key, decrypting the received encrypted cryptographic key;
associating the obtained cryptographic key with the storage domain and the communicating party, and
encrypting the data with the cryptographic key and storing the encrypted data in said storage entity.

20. The secure component of claim 19, wherein,
the session domain key (SDa) is generated by the TTP,
receiving the SDa from the TTP comprises receiving an encrypted message transmitted by the TPP, wherein the TTP generated the encrypted message using a public key belonging to the TP,
the encrypted message comprises the SDa and the storage domain identifier (SDI), and
the secure component (SC) is configured to decrypt the encrypted message using a private key belonging to the SC.

21. The secure component of claim 20, wherein the information transmitted to the TTP further comprises an encrypted nonce (Nvmmc) that was generated using a public key belonging to the TTP, and
the encrypted message further comprises the none (Nvmmc).

22. The secure component of claim 21,
wherein
the cryptographic key is generated by the TPP using a master key and a nonce, and
the message received from the TPP further comprises i) an encrypted token, wherein the token comprises said nonce, and ii) an encrypted message authentication code (MAC) for authenticating the token.

23. The secure component of claim 22, wherein the encrypted token and the encrypted MAC were encrypted using the session domain key of the storage domain.

24. The secure component of claim 23, further being operative to:
decrypt the encrypted token and the MAC;
associate the token and the MAC with the storage domain and the communicating party.

25. The secure component of claim 19, further being operative to:
receive, from the communicating party, a third request to read the encrypted data in said one of a plurality of storage entities of the storage domain;
fetch, from a local cache, the cryptographic keys associated with said one of a plurality of storage entities; and decrypt the encrypted data with the cryptographic keys associated with said one of a plurality of storage entities.

26. The secure component of claim 25, further being operative to:
receive, from the communicating party, a third request to read the encrypted data;
determine that the cryptographic key is not stored in a local cache;
as a result of determining that the cryptographic key is not stored in a local cache, send, to the trusted third party, a request message comprising the token and the MAC; and
receive, from the trusted third party, the cryptographic key.

27. The secure component of claim 19, further being operative to:
receive, from the communicating party, a third request to store new data in said one of a plurality of storage entities of the storage domain;
fetch, from a local cache, the cryptographic keys associated with said one of a plurality of storage entities; and
encrypt the new data with the cryptographic keys associated with said one of a plurality of storage entities and storing the encrypted new data in said one of a plurality of storage entities.

28. The secure component of claim 27, further being operative to:
receive, from the communicating party, a third request to store new data in said one of a plurality of storage entities of the storage domain;
determine that the cryptographic key is not stored in a local cache;
as a result of determining that the cryptographic key is not stored in a local cache, send, to the trusted third party, a request message comprising the token and the MAC;
receive, from the trusted third party, the cryptographic key; and
encrypt the new data with the cryptographic key.

29. The secure component of claim 19, wherein the communicating party is a virtual machine running on a trusted platform.

30. The secure component of claim 19, further being operative to:
send a storage entity identifier to the communicating party to be used for identifying a storage entity associated with said storage entity identifier.

* * * * *